ANALOG-TO-DIGITAL CONVERTER

Filed Feb. 2, 1967

3,509,560
ANALOG-TO-DIGITAL CONVERTER

John O. Bowers, Jr., Jon Philip Ray, and Philip A. Toney, Maitland, Fla., assignors to General Dynamics Corporation, a corporation of Delaware Filed Feb. 2, 1967, Ser. No. 613,576
Int. Cl. H03k *13/17*
U.S. Cl. 340—347 5 Claims

ABSTRACT OF THE DISCLOSURE

A successive approximation converter is disclosed wherein a resistive ladder network to which a precision reference voltage is applied by way of analog switches is used to generate binary-weighted voltages. An impedance translating device, such as a buffer amplifier which presents a high impedance to the source of precision reference voltage is included and facilitates the use of analog switches and a precision power supply which need handle only low currents. The reference source may be regulated to the necessary precision by relatively simple means, such as a Zener-diode circuit. The switches are controlled by stages of a register each of which corresponds to a different bit of the digital code into which the analog input is to be converted. A group of tandem connected one-shot multivibrators operate the stages of the register so that the generated binary weighted voltages have durations which are functions of the significance of the bit of the code to which they correspond. The analog input is compared with the binary-weighted voltages to produce outputs which represent the sense of the difference therebetween and also the binary values of the bits of the code. These outputs are applied to the stages of the register at the end of the duration of the weighted voltages for the bits to which they correspond, and the value of the bits are stored in these corresponding register stages. The register may be read out in order to derive the digital information.

The present invention relates to analog-to-analog converters and particularly to an improved analog-to-digital converter of the successive approximation type.

The invention is especially suitable for use in analog-to-digital converters wherein binary-weighted voltages are successively compared with an analog voltage to be digitized; the results of which comparison are stored in a register and may be read out therefrom.

In successive approximation analog-to-digital converters, a digital number is stored in a register containing a plurality of bistable devices, such as flip-flops, corresponding in number to the number of binary bits of the desired digital number. A resistor network to which a precision regulated power supply is connected by way of switches controlled by the flip-flops generates a binary-weighted voltage which is compared with the analog input to be digitized. The result of the comparison is used to change the states of the flip-flops in the register sequentially from the flip-flop which stores the most significant bit to the flip-flop which stores the least significant bit. Inasmuch as the generation of the binary-weighted voltages and the comparison thereof with the analog input must be accomplished sequentially therein, complex logic and control circuits have been used in order to generate the necessary timing and control signals. The resulting configuration has intrinsic high cost, particularly when the converter is packaged in a limited amount of space. Moreover, tolerences in the timing imposed by the logic circuitry may degrade the precision and accuracy of the conversion.

Another disadvantage of the existing analog-to-digital converters is that their speed of operation has been limited by the transient response of the comparison circuits and other elements thereof. In other words, a minimum amount of time is allowed for each bit decision (viz, the determination of the value of each bit of the code).

Another drawback of successive approximation converters is the bulk and complexity of a satisfactory precision power supply which is capable of delivering a sufficiently high current which may be changed abruptly to supply different output levels without overshoot or undershoot. Moreover, the total number of bits within the capacity of the converter is limited by the current capacity of the supply.

Accordingly, it is an object of the present invention to provide an improved analog-to-digital converter of the successive approximation type wherein the foregoing difficulties and disadvantages are substantially eliminated.

It is a further object of the present invention to provide an improved analog-to-digital converter having simplified sequencing logic.

It is still a further object of the present invention to provide an improved successive approximation analog-to-digital converter which is more accurate than known converters of this type for a given digitizing speed.

It is still a further object of the present invention to provide an improved successive approximation analog-to-digital converter in which the adverse effects of distributed capacitance in the resistor networks in the generation of binary-weighted comparison voltages is substantially eliminated.

Briefly described, an analog-to-digital converter embodying the invention is operative to convert an analog input signal into a digital number having a plurality of bits. Analog elements including a resistive ladder network, a regulated power supply and analog gates, say in the form of analog switches, are provided to generate binary-weighted signals each of which corresponds to a different bit of the number. Means are provided for producing these signals with durations which are a function of the significance of the bit to which they correspond. Specifically a register having a plurality of flip-flop stages, each allocated to a different one of the analog switches, controls the operation thereof. A plurality of tandem connected, mono-stable devices, each producing an output pulse having a duration which is a function of the significance of a different bit of the number, conditions the one of the flip-flop stages to which it corresponds to control its respective switch so that the binary-weighted voltages have the desired durations. A comparator responsive to the binary-weighted voltages and the analog input successively in time sequence produces outputs each corresponding to a successive one of the weighted voltages, which outputs also represent the values of the bits corresponding thereto. Each flip-flop is operated by the pulse from a mono-stable device to which it corresponds to receive the comparator output only after the elapse of the period of the weighted voltage corresponding to the output. Accordingly, the state of each flip-flop is changed to represent the value of the bit of the number to which the flip-flop corresponds. An impedance transforming device, such as a buffer amplifier which presents a high impedance to the precision power supply and a low impedance to the resistance network, can be used. The resistors of the network may, therefore, have relatively low resistance values, notwithstanding that the power supply need only supply a relatively low current. Thus, simplified regulation means may be used in the power supply and low current, accurate analog gates may also be used. Since the values of the resistors in the network are low, the distributed capacitance thereof can not prevent abrupt changes in the binary-weighted voltages and does not limit the digitizing speed of the system.

The invention itself, both as to its organization and method of operation as well as additional objects and advantages thereof will become more readily apparent from a reading of the following description in connection with the accompanying drawings in which.

Figures 1, 2, 3:
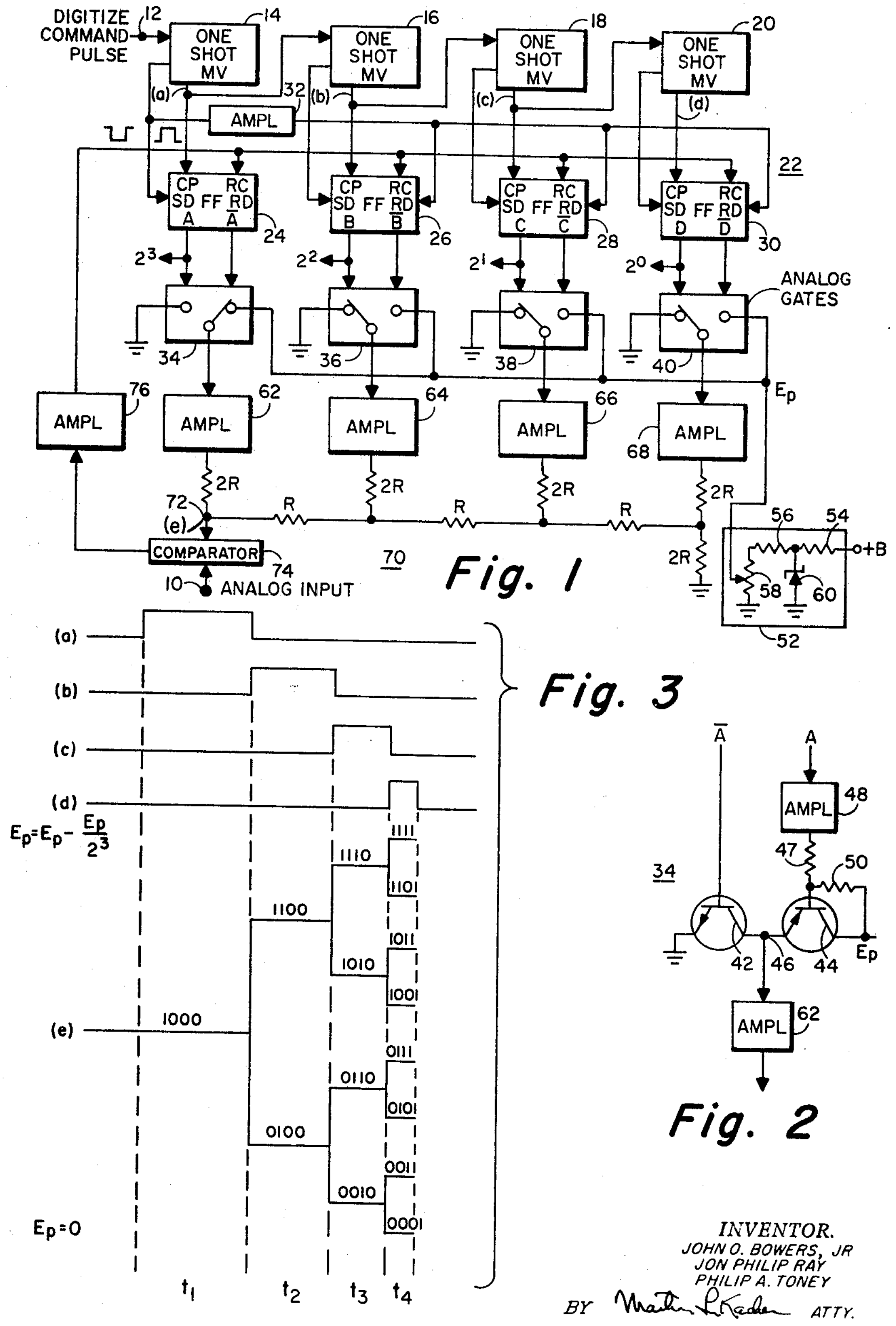
FIG. 1 is a simplified block diagram of a successive approximation analog-to-digital converter embodying the invention.
FIG. 2 is a circuit diagram showing an analog gate which is used in the system of FIG. 1.
FIG. 3 is a chart showing the timing of voltages which may be produced at different periods in the system shown in FIG. 1.

Referring more particularly to FIG. 1, command pulses for initialing the operation of the system to digitize an analog input voltage, which is applied at input terminal 10, may be applied at another input terminal 12. These command pulses may be supplied from a computer or timing generator of a telemetry system. The first of a plurality of tandem connected mono-stable devices, shown as one-shot multivibrators 14, 16, 18 and 20 receives the command pulses. These multivibrators each produce on its output lines output pulses of different duration. The pulses which are produced on one line are illustrated in waveforms (*a*), (*b*), (*c*) and (*d*) in the timing chart of FIG. 3. The pulses on the other line are similar, but of opposite polarity, as shown adjacent to the one-shot 14. These different durations each correspond to the significance of a different bit of the digital number or code into which the analog input is to be converted. Thus the first one-shot multivibrator 14 produce pulses of longest duration and the remaining one-shots 16, 18 and 20 produce pulses of successively shorter duration. It will be appreciated that only a four bit digital number is considered in this disclosure in order to clarify the presentation of the invention. A system in accordance with the invention may be operative to digitize the analog input into a larger number of bits depending upon the desired precision of the conversion. One additional one-shot multivibrator, of course, will provide for each additional bit of the number.

The one-shot multivibrators have inputs which are responsive to a negative going trigger pulse. Thus the second one-shot 16 will be triggered at the termination or lagging edge of the pulse from the first one-shot and the third one-shot 18 will be triggered at the termination of the pulse from the second one-shot and so forth. The one-shot multivibrators provide the entire sequencing system of the converter. Additional gates, clock pulse generators and other complex timing are eliminated.

A register 22 including flip-flop stages 24, 26, 28 and 30 stores the digital number into which the analog input is converted. The first flip-flop 24 corresponds to the most significant or highest order bit of the number (23). The remaining flip-flops 26, 28 and 30 respectively correspond to the $2^2$, $2^1$, $2^0$ bits of the digital number. These flip-flop stages may be of the type having a sampling or strobe input indicated at CP. This input is AC coupled and must be a negative going signal in order to condition the flip-flop to be reset when pulses are applied to its AC coupled input terminal RC. The flip-flop also may have AC coupled set input terminals (not shown) which are desirably grounded. Flip-flops of this type are available in integrated circuit form as many of the other active elements used in the system. A flip-flop suitable for use in the register 23 may be obtained from Texas Instruments Inc. of Dallas, Tex., their type SN15945.

Upon receipt of a digtizing or command pulse at the input terminal 12, the first one-shot 14 produces its output pulse (*a*). The other one-shot 14 output pulse which is coincident with but of opposite polarity to its output pulse (*a*) is applied to the DC coupled set terminal SD of the first flip-flop 24, and by way of a buffer amplifier

32 to the DC coupled reset terminal RD of the remaining flip-flops 26, 28 and 30. Thus, initially and at the beginning of digitizing the first flip-flop 24 is set while the remaining register flip-flops 26, 28 and 30 are reset. The analog switch circuits 34, 36, 38 and 40 are connected to the "1" and "0" outputs of the register flip-flops 24, 26, 28 and 30 respectively. The switches are illustrated as single-pole, double throw switches. This circuitry of these switches is illustrated in FIG. 2. It may be desirable to use in lieu of the FIG. 2 switches FET (Field Effect Transistor) switches together with associated FET driver circuits therefor.

The switch 34 illustrated by way of example, includes a pair of transistors 42 and 44. The PNP transistor is connected in inverted configuration to achieve a lower offset voltage (drop) therethrough. Thus the collector should be viewed as the emitter as the description proceeds. The $\bar{A}$ output of the flip-flop 24 is connected to the base of the NPN transistor 42 while the base of the PNP transistor 44 is connected via an inverter amplifier 48 and a resistor 46 to the A output of the flip-flop 24. A source of precision reference voltage $E_p$ is connected to the collector of the transistor 44. The emitter of the other transistors 44 and 42 are connected at a junction 46. The output of the switch is taken at the junction 46. If the flip-flop 24 is set, its A output will be at high level, while its A output will be low level, say at ground potential. By virtue of the inversion in the amplifier 48, the level at the A output of the flip-flop will be low (say at ground potential) while the $\bar{A}$ output of the flip-flop will bring the base of the other transistors 42 also to ground potential. The transistor 42 will then be biased "off" (non-conducting) and the transistor 44 will be biased "on" (conducting). The resistor 47 provides drive current limiting and another resistor 50 which is connected between the source at $E_p$ and the base of the transistor 44 improves the recovery time of the transistor 44 when it is turned off. The position of the poles of the switch in the first gate 34, as shown in FIG. 1, indicates that the $E_p$ is connected to the output of the gate 34 and corresponds to the condition of the gate when the flip-flop 24 is set, as described in connection with FIG. 2. Similarly the position of the pole of the switch in the other gates 36, 38 and 40 at the grounded terminal is the initial condition of these gates when their respective flip-flops 26, 28 and 30 are reset.

The precision reference voltage $E_p$ is obtained from a source of voltage indicated at +B and is regulated by means of a voltage regulator circuit 52. This circuit includes two resistors 54 and 56 and a potentiometer which are series connected between +B and ground. A Zener diode 60 is connected between the junction of resistors 54 and 56 and ground. The diode 60 will operate beyond its reverse breakdown potential and thereby regulate the +B voltage to maintain reference voltage $E_p$ with requisite precison. A single Zener diode 60 may be sufficient to provide the requisite regulation inasmuch as the analog gates and their associated circuits need only draw relatively low current. The capability of impedance transformation devices make it possible for the system to draw only low current. These devices are shown in the form of amplifiers 62, 64, 66 and 68 which are connected to the output of the analog switches 34, 36, 38 and 40 respectively, and connect these gates to different resistors of resistive ladder network 70. The amplifiers themselves may be unity gain buffer amplifiers, such as emitter followers which present a high impedance to the power supply 52 and low impedance to the ladder network 70. More desirably, however, the amplifiers are operational amplifiers connected in non-inverting configuration and which have feedback circuits which provide unity gain. The values of the resistors in this network 70 may therefore be very low since the output resistance of the buffer amplifiers 62, 64, 67 and 68 is very much lower. In the event that the amplifiers 62, 64, 66 and 68 are not used, a a high current capacity precision regulated power supply may be used in lieu of the circuit 52 and yet retain the other features of the invention.

The resistors which make up ladder network 70 have values indicated as R and 2R, so that the output voltage obtained at the output terminal 72 of the network will be a binary-weighted voltage. This voltage is indicated at waveform (*e*) in FIG. 3. A suitable value of R may be 5,000 ohms. The resistors are desirably precision resistors which maintain their values within the close tolerance over a wide temperature range.

The output terminal 72 of the network 70 and the analog input terminal 10 are connected to the different inputs of a differential voltage comparator circuit 74. This circuit may be a difference amplifier which produces an output which is a positive level when the binary-weighted voltage at terminal 72 is greater than the analog input voltage or a level of negative polarity when the sense of the difference between the binary-weighted voltage and the analog input is opposite. A suitable circuit for use as the comparator 74 may be Fairchild Semiconductor Corporation type *u*A710 and suitable input and output circuits therefor.

The output voltage from the comparator is amplified in a buffer amplifier 76 which also inverts it in order to provide a negative pulse. Such a pulse is required in order to actuate the AC coupled reset input RC of the flip-flops 24, 26, 28 and 30 to which the output of the amplifier 76 is applied.

In operation when the analog switches 34, 36, 38 and 40 are conditioned to the states as indicated in FIG. 1 by the positions of the switches in their respective analog gates, the binary-weighted voltage initially is of intermediate level (one-half full scale) as indicated in waveform (*e*). The first decision is then to determine the value of the most significant ($2^3$) bit of the digital number and has 50% influence over the value of the final number. Accordingly, it is desirable that the comparator have the greatest amount of time to make this first decision. The time allowed ($t_1$) for this decision is the duration of the pulse (*a*) from the first one-shot 14 because the binary-weighted voltage is of duration almost equal to the pulse (*a*) duration. It will be recalled that the one-shot 14 is triggered by the command pulse. The negative going output pulse which is applied by the one-shot 14 to the input SD sets a "1" into the flip-flop 24 and resets all of the other flip-flops to "0." The flip-flop 24 cannot be reset by the comparator output until the negative going edge of the one-shot output pulse (*a*). Thus the binary-weighted voltage persists for the entire pulse (*a*) duration. If the binary-weighted voltage is greater than the analog input, the first flip-flop 24 will be reset, otherwise it will remain in the set condition. In other words, at the moment the one-shot pulse ends, the output from the comparator is accepted and stored in the flip-flop as a "1" or "0" bit depending upon the sense of the difference between the binery-weighted voltage and the analog input. The duration of the one-shot pulse determines, therefore, how much settling time is given to this bit before the decision is made and the bit is sampled and stored. During the next interval $t_2$, the second flip-flop 26 is initially set to its "1" state by the leading (negative going) edge of the complementary output pulse to the pulse (*b*). The maximum possible difference between the comparator input voltages during the second bit time $t_2$ is only one-half that during the first bit time $t_1$. Accordingly, a lesser amount of time can be allocated to the pulse (*b*). Again, if the binary-weighted voltage is greater than the analog input, the second flip-flop 26 will be reset, otherwise it will remain in its set state. It will be observed from FIG. 3 that the values of the bits are stored in the flip-flop stages of the register 22 during the digitizing process. Similarly in the third bit time $t_3$ the value of the $2^1$ bit will be stored in the flip-flop and in the fourth $t_4$, the $2^0$ bit will be stored in the flip-flop 30. The maximum possible difference of the comparator input voltages is always only one-half that possible during the previous bit times ($t_2$ and $t_3$). Accordingly, the bit times $t_3$ and $t_4$ may be progressively smaller.

The digital number may be read out of the system by suitable gating means connected to the A, B, C and D output terminals of the flip-flops in the registor 22.

From the foregoing description it will be apparent that there has been provided an improved analog-to-digital converter system of the successive approximation type. While a simplified embodiment of the system in accordance with the present invention has been described for the benefit of the exposition of the invention, it will be appreciated that the system may include such additional circuits as temperature compensator circuits and may be packaged in integrated circuit form. Additions to and modifications of the herein described system within the scope to the invention will, undoubtedly suggest themselves to those skilled in the art. Accordingly, the foregoing description should be taken merely as illustrative and not in any limiting sense.

What is claimed is:

1. A system for converting analog information represented by an input signal into digital form, said system comprising, (a) means for generating signals weighted in accordance with a digital code, each of said weighted signals corresponding to a different bit of said code and having a duration which is a function of the significance of the bit of said code to which it corresponds, (b) means for comparing said input signal with each of said weighted signals for providing outputs which represent the sense of the difference therebetween, and which correspond to the same bits as said weighted signals and represent the binary values therefor in accordance with the sense of said difference, and (c) means responsive to said comparing means outputs and included in said generating means for storing said bits represented by each of said outputs and operative to store each of said bits only at the end of the duration of the one of said weighted signals corresponding thereto.

2. The invention as set forth in claim 1 wherein said generating means includes a voltage regulating means, a plurality of gate means for selectively connecting the output of said regulating means to different resistors of a resistive ladder network, and an impendance translating device which presents a high impedance to said gate means and a low impedance to said resistive ladder network is connected between each of said gate means and each of said resistors of said resistive ladder network.

3. The invention as set forth in claim 1 wherein said storing means includes a register having a plurality of flip-flop stages each of said flip-flop stages being connected to said comparing means so that said comparing means output signals can change the state thereof.

4. The invention as set forth in claim 3 wherein said generating means includes a plurality of mono-stable devices connected in tandem each of which provides an output pulse of different duration from the others of said mono-stable devices which durations are said functions of the significance of the bits of said code, and means for applying said pulses to different outputs of the flip-flop stages of said register for enabling said stages to respond to said comparator means output signals at the end of the duration of the one of said pulses applied thereto.

5. The invention as set forth in claim 1

(a) wherein said generating means includes a plurality of one-shot multivibrators connected in tandem, each for producing an output pulse which triggers the next successive one thereof, each pulse having said duration which is a function of the significance of the bit of said code to which it corresponds, a register having a plurality of flip-flop stages each corresponding to different one of said bits, a plurality of analog switches each also coresponding to different one of said bits and each being connected to the flip-flop stage corresponding to a like one of said bits, a resistive ladder network, a source of precision reference voltage selectively connected to said ladder network by way of said analog switches for generating binary-weighted voltage levels, (b) wherein a said comparing means includes a comparator circuit connected to the output of said ladder network for comparing the levels produced by said ladder network with said analog input, said comparator circuit also being connected to an input of said flip-flops for providing outputs which change the state thereof in accordance with the sense of the difference between said levels and said analog input, and (c) wherein means are provided for applying said output pulses from said one-shot multivibrators to the ones of said flip-flop to which they correspond for enabling said flip-flops to receive said outputs from said comparator at the end of the duration of the ones of the weighted signals for the bits to which said flip-flops correspond.

References Cited

UNITED STATES PATENTS

| | | | |
|---|---|---|---|
| 2,754,503 | 7/1965 | Forbes | 340—347 |
| 3,134,971 | 5/1964 | Sem-Sandberg | 340—347 |
| 3,225,347 | 12/1965 | Doyle | 340—347 |
| 3,255,447 | 6/1966 | Sharples | 340—347 |

MAYNARD R. WILBUR, Primary Examiner

G. EDWARDS, Assistant Examiner